United States Patent
Dapoz et al.

(10) Patent No.: US 12,025,170 B2
(45) Date of Patent: Jul. 2, 2024

(54) APPARATUS FOR A BURST-THROUGH TORQUE INDICATOR

(71) Applicant: ILLINOIS TOOL WORKS INC., Glenview, IL (US)

(72) Inventors: Albert James Dapoz, Sterling Heights, MI (US); Nicholas Quincy, Royal Oak, MI (US)

(73) Assignee: Illinois Tool Works Inc., Glenview, IL (US)

( * ) Notice: Subject to any disclaimer, the term of this patent is extended or adjusted under 35 U.S.C. 154(b) by 371 days.

(21) Appl. No.: 17/280,394

(22) PCT Filed: Sep. 27, 2019

(86) PCT No.: PCT/US2019/053399
§ 371 (c)(1),
(2) Date: Mar. 26, 2021

(87) PCT Pub. No.: WO2020/069279
PCT Pub. Date: Apr. 2, 2020

(65) Prior Publication Data
US 2022/0034355 A1    Feb. 3, 2022

Related U.S. Application Data

(60) Provisional application No. 62/737,461, filed on Sep. 27, 2018.

(51) Int. Cl.
*F16B 31/02*    (2006.01)
*F16B 37/00*    (2006.01)

(52) U.S. Cl.
CPC .......... *F16B 37/005* (2013.01); *F16B 31/021* (2013.01)

(58) Field of Classification Search
CPC .............................. F16B 31/02; F16B 31/021
USPC ...................................................... 411/1, 8, 9
See application file for complete search history.

(56) References Cited

U.S. PATENT DOCUMENTS

| | | | | |
|---|---|---|---|---|
| 4,618,291 A | * | 10/1986 | Wright | F16B 37/00 411/3 |
| 4,662,795 A | | 5/1987 | Clark et al. | |
| 4,955,758 A | * | 9/1990 | Hyde | B29C 45/0005 405/259.1 |
| 5,282,698 A | | 2/1994 | Wright et al. | |
| 5,352,065 A | * | 10/1994 | Arnall | F16B 31/02 411/3 |
| 5,443,332 A | * | 8/1995 | Hollis | F16B 31/021 405/259.2 |

(Continued)

FOREIGN PATENT DOCUMENTS

GB    2273538 A    6/1994

OTHER PUBLICATIONS

International Search Report and Written Opinion for PCT/US2019/053399, dated Dec. 4, 2019. (12 pages).

*Primary Examiner* — Flemming Saether
(74) *Attorney, Agent, or Firm* — Quarles & Brady LLP

(57) ABSTRACT

A nut is configured to be secured to a bolt. The nut includes a main body that defines an axially aligned bore with threads disposed on an inner wall thereof. Further, the nut includes a dome-shaped head that has an axially aligned aperture and that is provided to be deformed by threads on the bolt when a predetermined burst-through torque is applied thereto.

16 Claims, 11 Drawing Sheets

(56) References Cited

U.S. PATENT DOCUMENTS

| | | | | |
|---|---|---|---|---|
| 5,873,689 A | * | 2/1999 | Mensour | E21D 21/008 |
| | | | | 411/3 |
| D449,515 S | * | 10/2001 | Sato | D8/399 |
| 6,296,429 B1 | * | 10/2001 | Wright | F16B 31/021 |
| | | | | 411/3 |
| 6,443,681 B1 | * | 9/2002 | Thonnes | F16B 23/0092 |
| | | | | 411/410 |
| 8,740,502 B2 | * | 6/2014 | Meidl | F16B 13/141 |
| | | | | 405/259.1 |

* cited by examiner

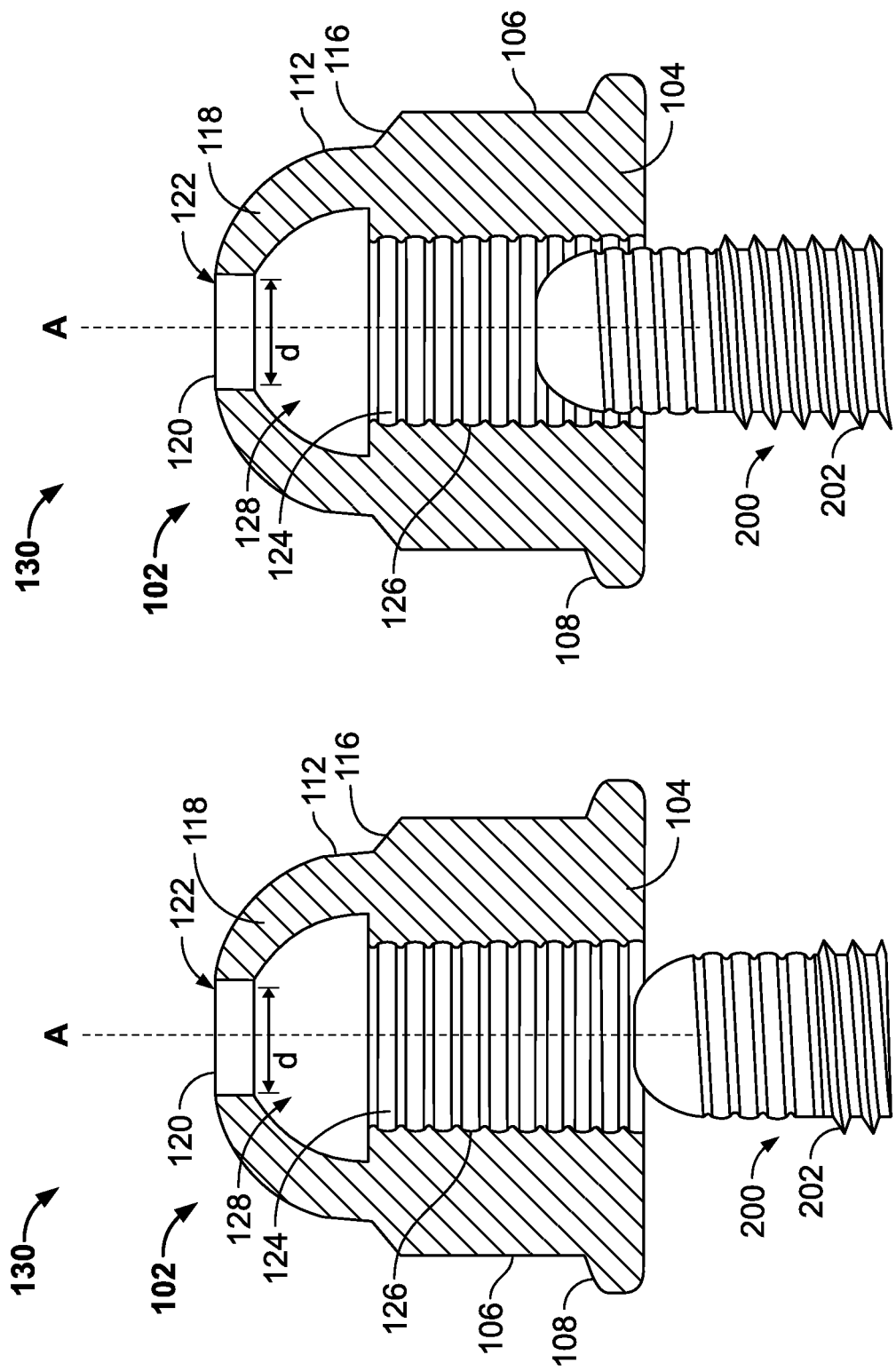

APPARATUS FOR A BURST-THROUGH TORQUE INDICATOR

CROSS-REFERENCES TO RELATED APPLICATIONS

This application represents the national stage filing of PCT/US2019/053399, filed Sep. 27, 2019, which claims the benefit of U.S. Provisional Application No. 62/737,461 filed on Sep. 27, 2018, which is hereby incorporated by reference in its entirety.

FIELD OF THE DISCLOSURE

The present invention relates to burst-through torque indicators. More specifically, a hex nut is disclosed that is capable of indicating burst-through torque resistance during fastening on a threaded member, such as a bolt, to avoid cross-threading.

BACKGROUND

Generally, in many applications, fastener assemblies may fasten two or more components to one another. For example, hex nuts and bolts are a common type of fastener that may be use to retain and support components.

SUMMARY

In one aspect, a nut is configured to couple to a bolt and comprises a main body and a dome-shaped head. The main body has an axially aligned bore and includes a first end, a second end, and threads disposed on an interior wall thereof. The dome-shaped head is disposed at the second end thereof and has an axially aligned aperture with an aperture diameter that is smaller than a bore diameter of the axially aligned bore. The dome-shaped head is provided to be deformed by threads disposed on the bolt when a predetermined burst-through torque is applied thereto. Further, the aperture diameter of the axially aligned aperture is inversely related to the predetermined burst-through torque.

In another aspect, a nut that is configured to couple to a bolt includes a main body and a dome-shaped head. The main body has an axially aligned bore having threads disposed on an interior wall thereof. The dome-shaped head is disposed at an outermost end of the main body and has an axially aligned aperture with an aperture diameter. Further, the dome-shaped head is provided to be deformed by threads disposed on the bolt when a predetermined torque is applied thereto.

In another aspect, a nut that is configured to couple to a bolt includes a main body, a dome-shaped head disposed at an outermost end thereof, and a flange. The main body has an axially aligned bore and includes six equidistantly spaced walls, a first end, a second end, and threads disposed on an interior wall of the axially aligned bore. The dome-shaped head has an axially aligned aperture having an aperture diameter that is smaller than a bore diameter of the axially aligned bore. The dome-shaped head further includes a cavity that adjoins the axially aligned bore and the axially aligned aperture. The cavity has a greatest diameter that is greater than the bore diameter and a volume that is equal to or less than a volume defined by a threaded portion of the bore. The flange is integrally formed with the main body at the first end and extends radially outward therefrom. Further, the dome-shaped head is provided to be deformed by threads disposed on the bolt when a predetermined burst-through torque is applied thereto. Further, the aperture diameter of the axially aligned aperture relates to the predetermined burst-through torque.

DESCRIPTION OF THE DRAWINGS

FIG. 11 depicts the cross-sectional view of the nut of FIG. 10 with an anti-cross threading bolt at the beginning stages of fastening;

FIG. 12 is a cross-sectional view of the nut of FIG. 11, wherein an unthreaded portion of the anti-cross threading bolt has been partially inserted;

DETAILED DESCRIPTION

Figures 1, 2:
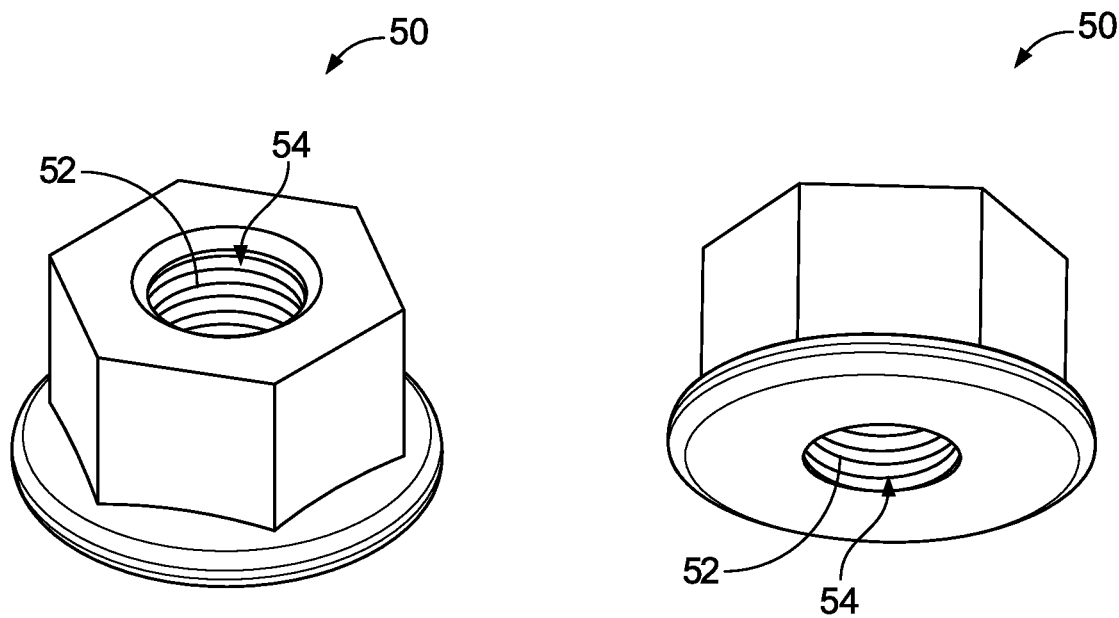
FIG. 1 is an isometric view of a top and side of a prior art hex nut.
FIG. 2 is an isometric view of a bottom and side of a prior art hex nut.

As noted above, in some contexts, it may be useful to secure or fasten two or more components with fastener assemblies, such as hex nuts and bolts. For example, panels, such as panels on an automobile, may need to be fastened to each other. Referring to FIGS. 1 and 2, some conventional fastener assemblies include a hex nut 50 with integral threads 52 disposed on a centrally located bore 54 that are provided to mate with threads on a corresponding bolt. After aligning a shaft of the bolt with the hex nut 50, rotational force, or torque, may be exerted on both the nut and the bolt to advance the mating process. To enhance performance of a fastener assembly, some conventional hex nuts have integral locking features that help prevent the hex nut from loosening after assembly. For example, prevailing torque locking nuts include a portion of distorted threads that creates frictional interference between the threads of the nut and a mating bolt. In some instances, the diameter of the centrally located bore and threads thereon may form an elliptical shape instead of a standard circular shape. As a result, an increased amount of torque is required to rundown (i.e., screw) the distorted hex nut onto the bolt. Similarly, an increased torque is required to remove the distorted hex nut. The distorted hex nut thus resists rotation in both directions and provides enhanced locking security. However, due to the increased friction resisting rotation during rundown, the threads of the bolt may be easily worn down.

A bad rundown can result from an improper fit between the threads of the hex nut and the bolt. Such an occurrence is often due to a hex nut being improperly aligned when (or as) it is threaded onto the bolt. This problem may be described as cross threading. The effects of cross threading are detrimental to the overall speed and quality of the assembly process. For example, cross threading may lead to a large resistance experienced by the machine performing the rundown, when may be interpreted by a machine or operator may as rundown completion, despite only threading the hex nut partially onto the bolt. If not discovered during the manufacturing process, a hex nut partially threaded onto a bolt may result in loosening, or failure, of an assembly during use due to an improper final clamp load. Alternatively, if the partially threaded hex nut is discovered prior to the completion of the assembly process, the rundown may be repeated. The result of cross threading is, therefore, poor product quality and/or increased manufacturing time Some conventional bolts (e.g., anti-cross threading bolts) overcome this problem by having a tip configured to avoid improper alignment and subsequent cross threading. Anti-cross threading bolts may have an unthreaded tip located adjacent a threaded portion, where the tip is inserted into a centrally located bore of a hex nut prior to the threads of the bolt engaging the threads of the hex nut. MATpoint® or MAThread® Type 'P' Point anti-cross threading bolts, for example, are commonly used. Such anti-cross threading bolts, however, are not as effective when used with prevailing torque locking nuts. Because the unthreaded tip of the anti-cross threading bolt is designed to insert into a circular cross section, anti-cross threading bolts still are at risk of misalignment and subsequent cross threading when used with distorted hex nuts. Therefore, a need exists for a nut with locking features that is compatible and effective with anti-cross threading bolts.

Furthermore, in some instances, tools and machines may be used during the assembly process to exert the proper torque to rundown (i.e., screw on) a hex nut or bolt. Machines and machine operators may also monitor torque during rundown as a means to detect rundown completion or errors. For example, referring to FIG. 3, which depicts a good rundown of a prior art hex nut, torque (newton-meters) and angle of rotation (degrees) may be monitored during rundown in some manufacturing processes. The machine may interpret a drastic increase in torque, as shown at point b, as indication that the rundown is complete. However, using torque to signify complete rundown can lead to manufacturing errors, especially when using distorted hex nuts.

Figure 3:
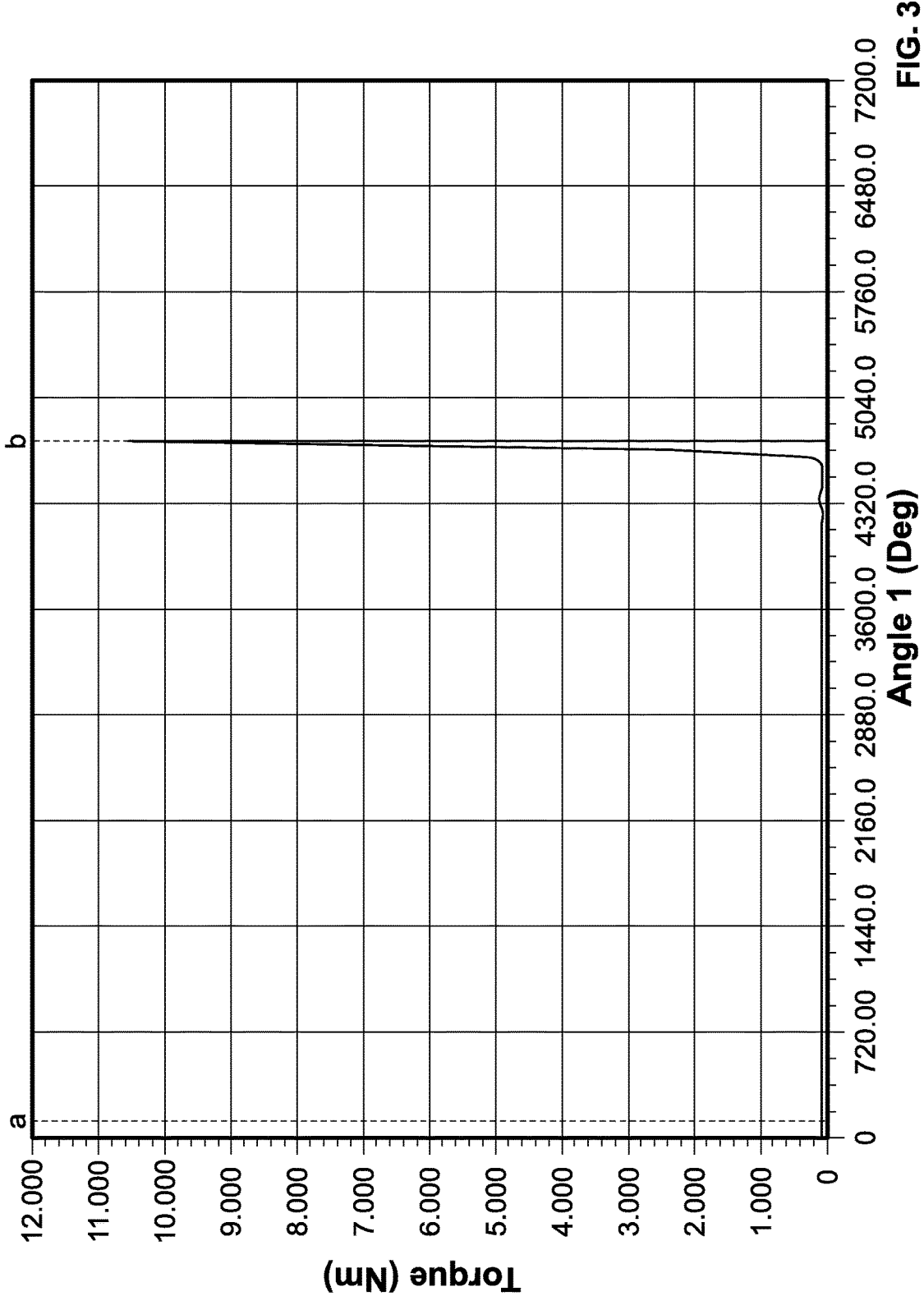
FIG. 3 is a graph depicting testing results of a prior art hex nut fully threaded onto a bolt, where torque in newton-meters is represented on the vertical axis and an angle of rotation in degrees is represented on the horizontal axis.
Figure 4:
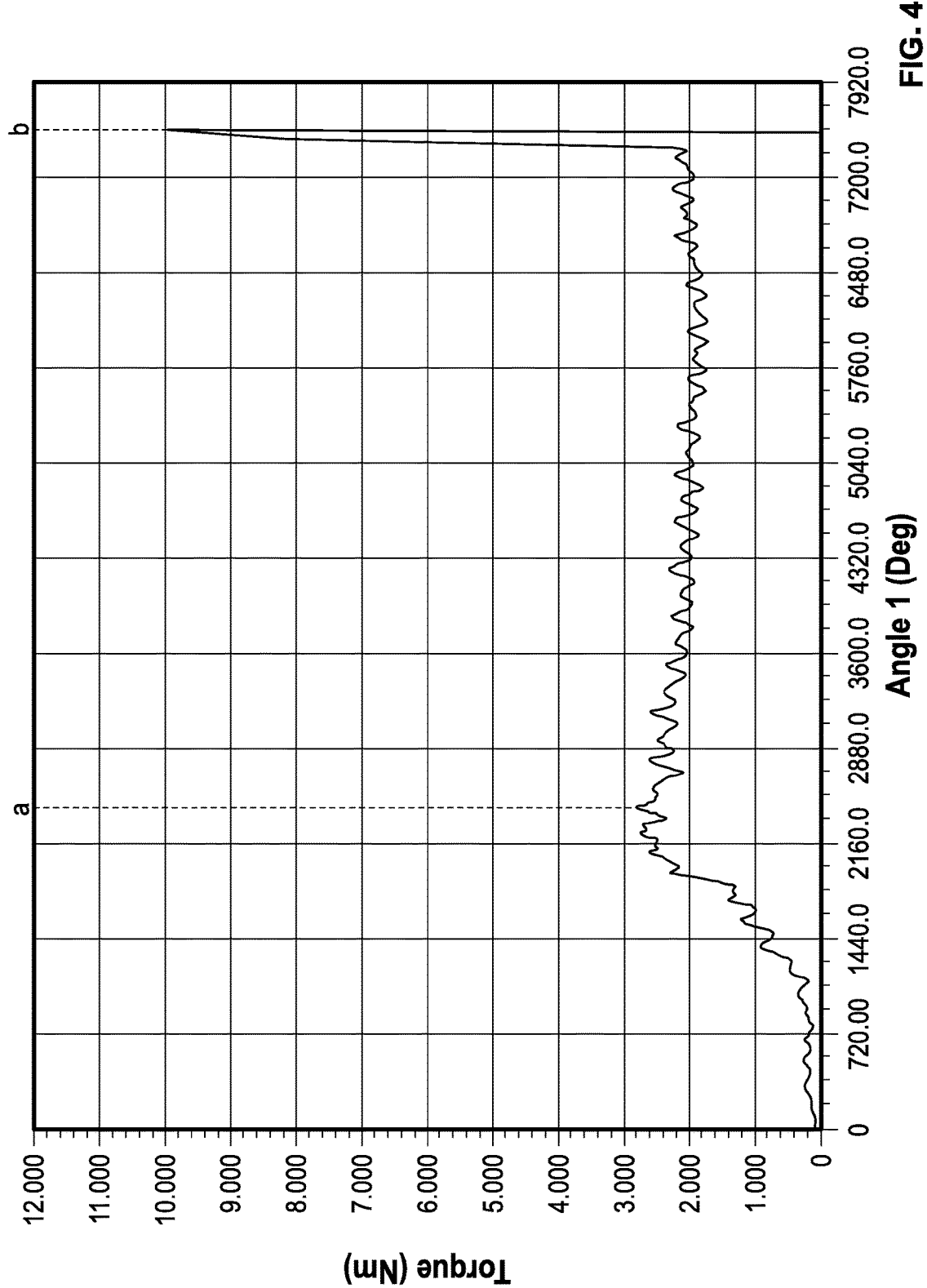
FIG. 4 is a graph depicting testing results of a prior art distorted hex nut fully threaded onto a bolt, where torque in newton-meters is represented on the vertical axis and an angle of rotation in degrees is represented on the horizontal axis.
Figure 5:
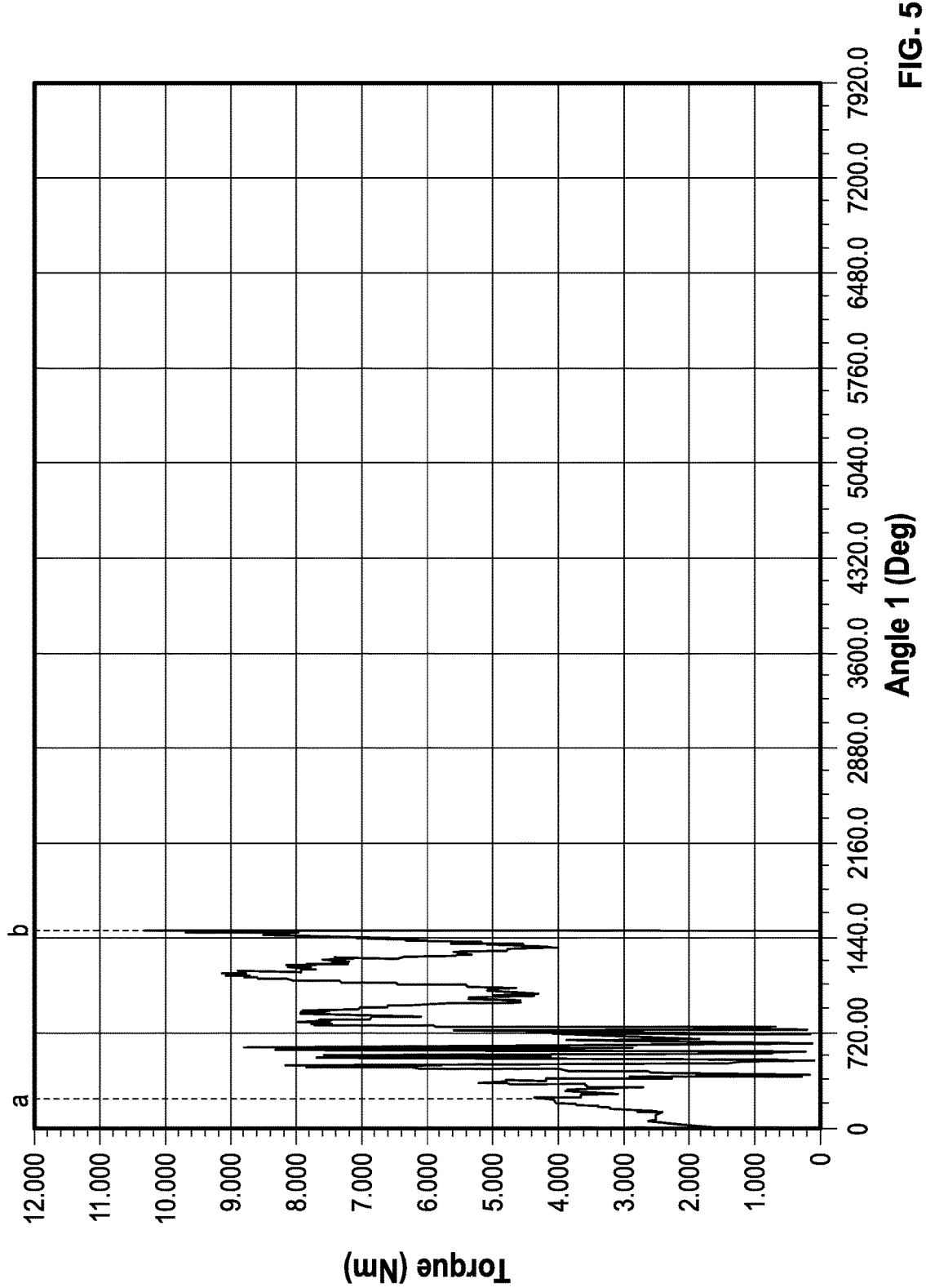
FIG. 5 is a graph depicting testing results of a prior art distorted hex nut partially cross-threaded onto a bolt, where torque in newton-meters is represented on the vertical axis and an angle of rotation in degrees is represented on the horizontal axis.
Figure 6:
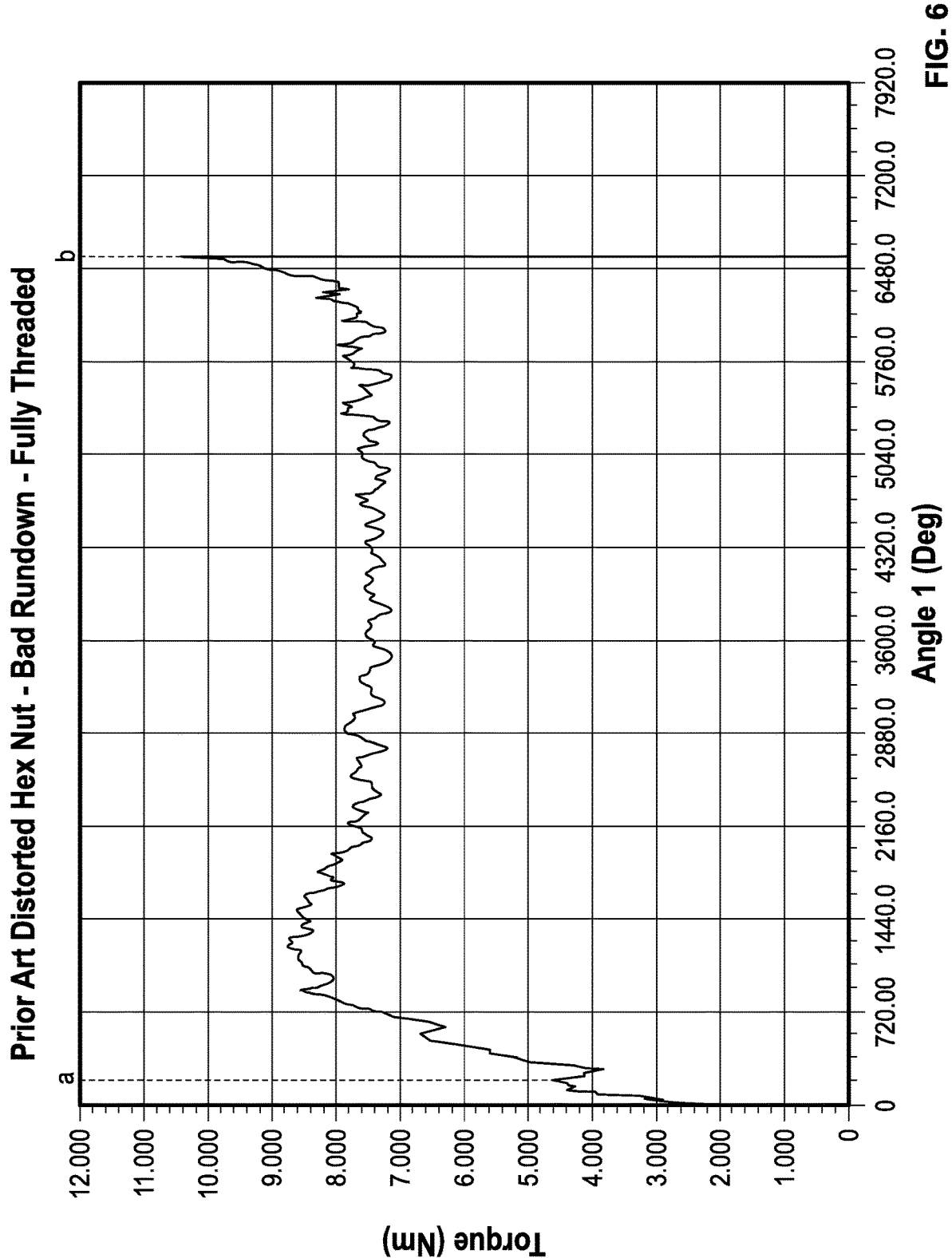
FIG. 6 is a graph depicting testing results of a prior art distorted hex nut fully cross-threaded onto a bolt, where torque in newton-meters is represented on the vertical axis and an angle of rotation in degrees is represented on the horizontal axis.

The prior art hex nut used in FIG. 3 does not have a distorted shape, so minimal frictional resistance is measured during rundown, as depicted between points a and b of the graph. In comparison, FIG. 4 illustrates a prior art distorted hex nut offering a consistent frictional resistance that is larger than the torque required during a good rundown of a non-distorted hex nut (see, e.g., FIG. 3). As shown, the measured torque remains largely consistent between points a and b, and the torque drastically increases at point b, which indicates that the rundown is complete. FIG. 5 illustrates a prior art distorted hex nut exhibiting characteristics of a bad rundown. Here, the rundown was stopped prior to being fully threaded or reaching a desired clamp load, as indicated by the angles of rotation. Further, the larger and more sporadic amounts of torque experienced during the bad rundown indicate that cross-threading occurred. FIG. 6 illustrates another example of a bad rundown of the same prior art distorted hex nut. In the illustrated graph, the torque remains, again, substantially consistent between points a and b. Together, the graphs in FIGS. 5 and 6 illustrate examples of the large and unpredictable amount of torque that can be experienced during a bad rundown caused by cross-threading. As described above, improper fit between or misalignment of a hex nut and a bolt can lead to cross threading. If not discovered during the manufacturing process, a finished assembly may disassemble, or fail, during use. Such a situation is more likely experienced when a prior art distorted hex nut is fastened onto an anti-cross threading bolt.

While distorted hex nuts may be preferred in some cases, it can be difficult to accurately distinguish between a good rundown and a bad rundown by monitoring torque. More specifically, FIG. 6, which depicts a bad rundown due to cross-threading, closely resembles the graph of FIG. 4, where a good rundown was experienced. Thus, the operator would have difficulty distinguishing between the torque experienced during a bad rundown and a good rundown when using such a prior art distorted hex nut with an anti-cross threading bolt.

The present disclosure overcomes the foregoing deficiencies of conventional fasteners by providing a hex nut that is compatible with anti-cross threading bolts (i.e., includes a circular cross-section) and can indicate to a machine performing the rundown whether it has performed a good or bad rundown. In some embodiments, the hex nut may include a locking feature to resist becoming loose or failing during operation. Further, according to aspects of the present disclosure, the nut may have a predetermined torque value that corresponds to proper tightening so that assembly error may be prematurely identified.

Figure 7:
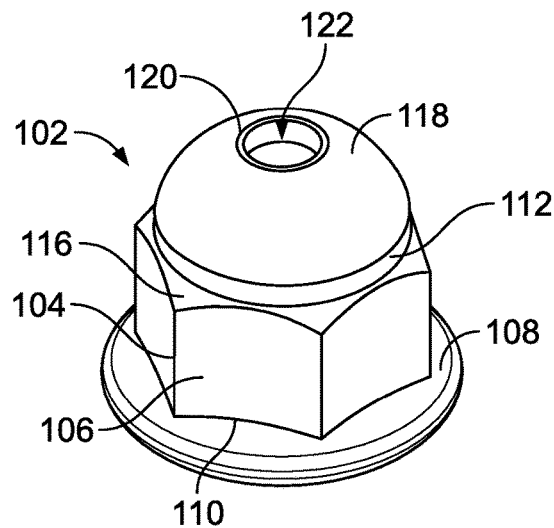
FIG. 7 is an isometric view of a top and side of a nut with a curved or domed head according to an aspect of the present disclosure.
Figure 8:
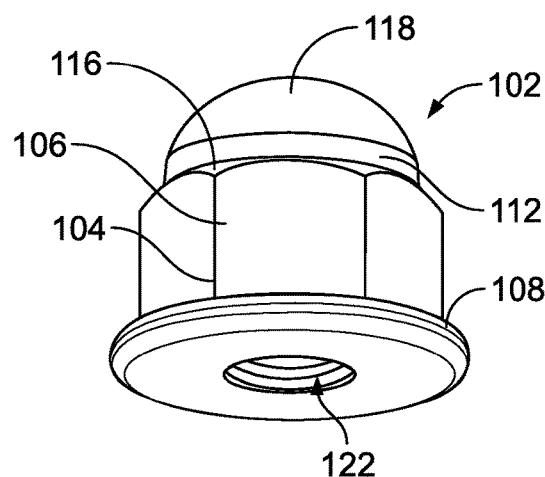
FIG. 8 is an isometric view of a bottom and side of the nut of FIG. 7.
Figure 9:
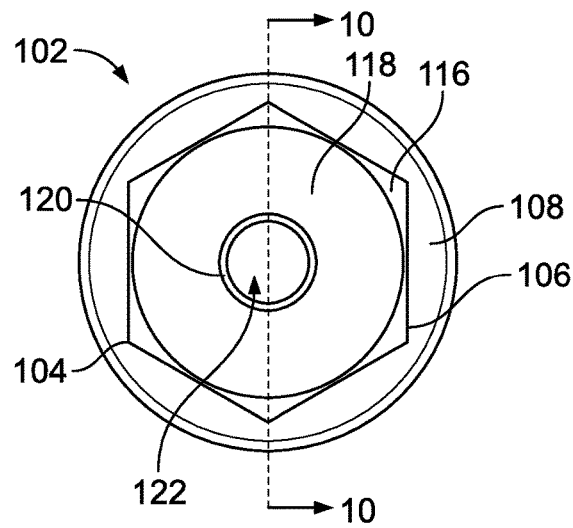
FIG. 9 is a top plan view of the nut of FIG. 7.

FIGS. 7-10 depict a nut 102 according to aspects of the present disclosure that is configured to couple to a bolt. Referring to FIGS. 7 and 8, the nut 102 may include a body 104 comprising a plurality of walls 106. In the illustrated embodiment, for example, the body 104 includes six equidistantly spaced walls 106 and, therefore, may be characterized as a hex nut. However, it is contemplated that a greater or fewer number of walls 106 may be provided. For example, the body 104 may comprise three walls, or four walls, or five walls, or eight walls, or ten walls. In fact, any appropriate number of equidistantly spaced walls may be provided that allow for the rotation of the nut 102 by an applied torque. Alternatively or additionally, the nut 102 may incorporate non-planar surfaces. The body 104 of the nut 102, for example, may be cylindrical. Further, the body 104 may incorporate recessed channels to provide areas for assembly tools to fit therein.

Figure 10:
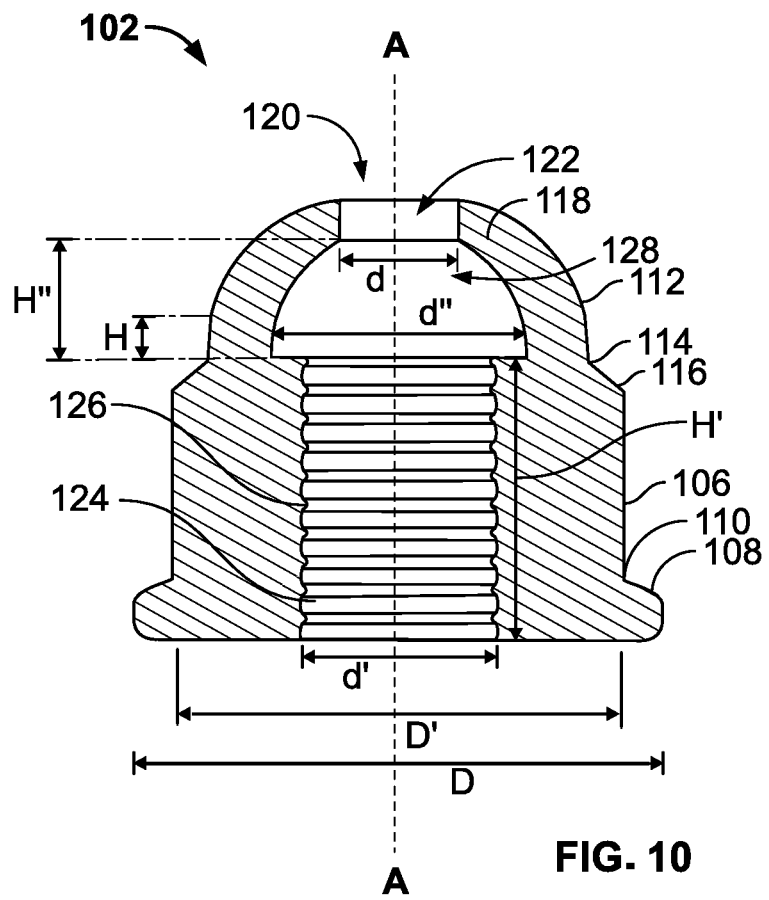
FIG. 10 is a cross-sectional view of the nut of FIG. 7 taken along the line 10-10 of FIG. 9.

Turning to FIG. 10, to provide enhanced performance, the nut 102 may further include an optional flange 108 at a first end 110 of the body 104. The flange 108 may extend radially outwardly from the body 104 and may have an outer diameter D larger than a greatest diameter D' between opposing walls 106 of the body 104. As such, the flange 108 provides an increased surface area to be in contact with a component to distribute force exerted by the nut 102, thereby providing enhanced compression and stability. The flange 108 may be attached to or integrally formed with the body 104, and may further include a plurality of edges as opposed to a circular cross-section. For example, in some instances, the flange 108 may include six equally sized edges. Further, the flange 108 may be composed of a material similar to that of the body 104, or, in a different non-limiting example, it may be formed from a different material.

The body 104 of the nut 102 may further include a neck 112 at a second end 114 of the body. In some instances, the neck 112 may be uniformly cylindrical and may extend parallel to an axis A of the nut 102 for a height H. The neck 112 may further have an outer diameter that is smaller than the outer diameter D of the flange 108. A beveled or chamfered portion 116 may be disposed between the neck 112 and the second end 114 of the body 104. However, the neck 112 or the portion 116 may comprise one or more surfaces with varying degrees of curvature or angles if desired. Although the nut 102 according to the present aspect includes the neck 112 and the portion 116, in some instances, one or both of the neck 112 and the portion 116 may be omitted.

A head 118 of the nut 102 may be disposed above the neck 112 at the second end 114. With particular reference to FIG. 10, the head 118 is shown to have a curvilinear profile and, in the present aspect, to have a substantially dome shape. The dome-shaped head 118 may define an aperture 120, which may extend through an uppermost and central portion of the head 118. The aperture 120 may define an outer end of a bore 122 that is axially aligned with the axis A and extends the length of the nut 102 between the head 118 and the flange 108. Additionally or alternatively, the dome-shaped head 118 may take on other curvilinear profiles or may have other geometric shapes entirely, such as angled or squared surfaces. The head 118 may be formed of materials like other portions of the nut 102 or body 104, or, in different embodiments, it may be formed of different materials. Further, the head 118 may be integrally formed with the nut 102 or body 104, or, alternatively, it may be attached or otherwise coupled to the nut 102 or body 104.

The bore 122 may have a substantially circular cross-section and may include conventional threading 124 on an interior wall 126 defining a portion of the bore 122. The threading 124 is provided to mate with mating threads on a corresponding bolt. In the present aspect, the wall 126 may extend in a direction parallel to axis A between the flange 108 and a junction between the portion 116 and the neck 112. Further, the wall 126 may have a height H' and a uniform bore diameter d'. In other instances, the wall 126 and/or threading 124 may extend about axis A to a height commensurate with the second end 114 of the body 104 or some other portion of the nut 102.

Additionally, a cavity 128 may form a portion of the bore 122. The cavity 128 may extend from a top of the wall 126 to the aperture 120 in the head 118, thereby adjoining the aperture 120 and the bore 122. The cavity 128 includes a height dimension H" that extends in a direction parallel to the axis A. In some instances, a greatest diameter d" of the cavity 128, which is provided adjacent an end of the wall 126 opposite the first end 110, is larger than the bore diameter d'. The greatest diameter d" may be generally described as being positioned between a transition point of the threaded and unthreaded portion of the bore 122. Furthermore, the cavity 128 may be generally characterized as having a volume V that may be equal to or less than a volume defined by a threaded portion of the bore 122.

Figures 13, 14:
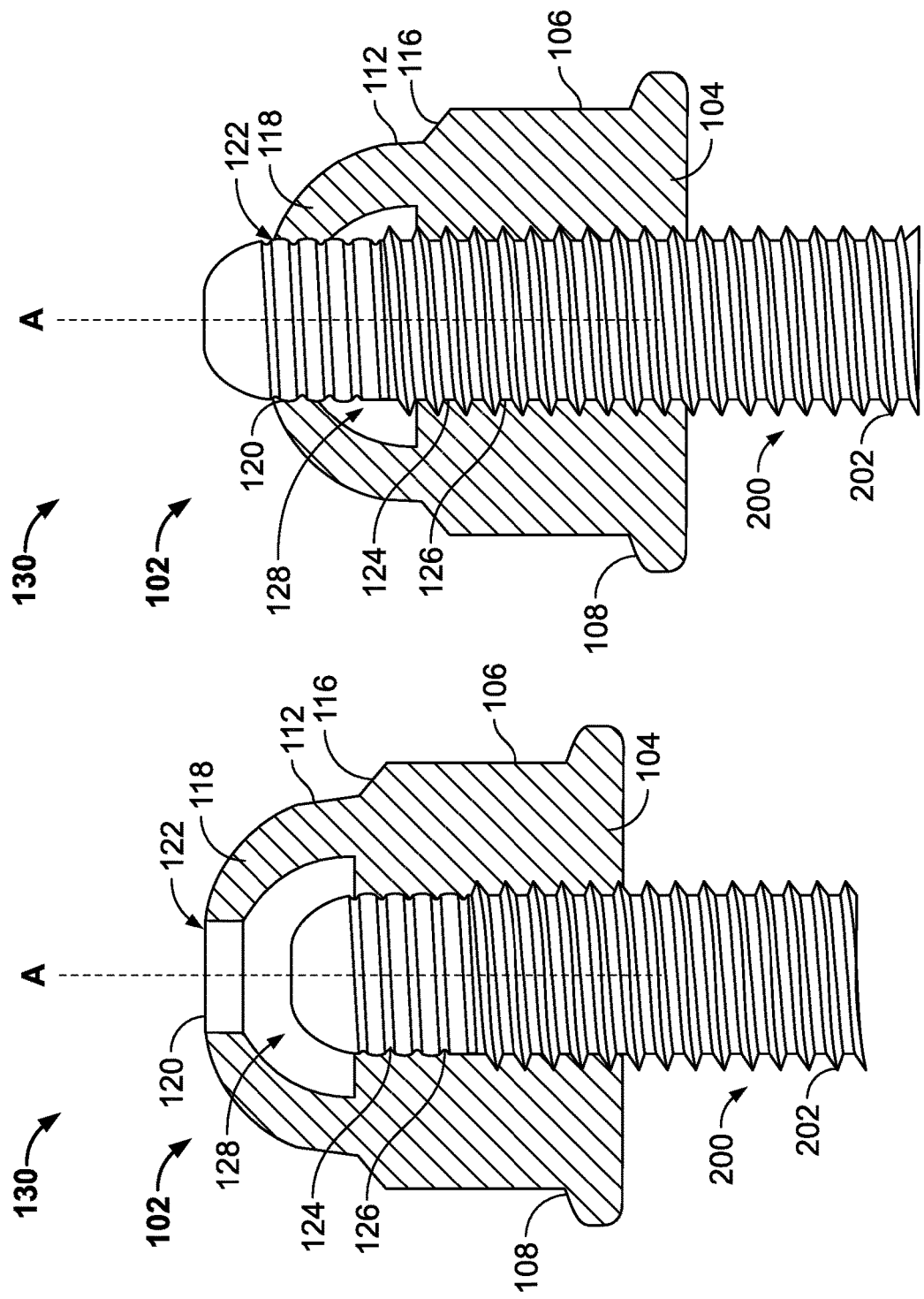
FIG. 13 is a cross-sectional view of the nut of FIG. 12, wherein a threaded portion of the anti-cross threading bolt has engaged with internal threading of the nut.
FIG. 14 is a cross-sectional view of the nut of FIG. 13, wherein the threaded portion of the anti-cross threading bolt has engaged with the internal threading of the nut and the unthreaded portion has penetrated the head of the nut.
Figure 15:
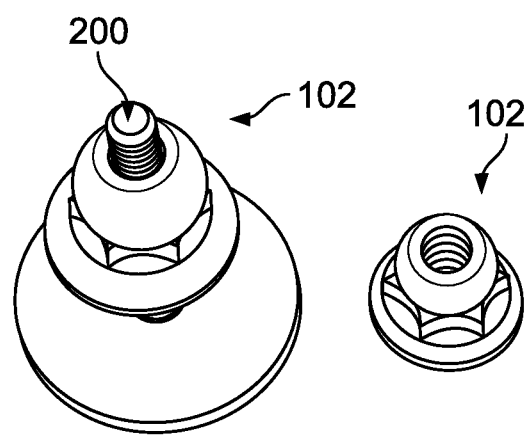
FIG. 15 is an isometric view of a nut according to an embodiment of the present disclosure threaded onto a bolt shaft.

FIGS. 11-14 illustrate a rundown procedure of a fastener assembly 130, which includes the nut 102 and an anti-cross threading bolt 200, at various stages. In FIG. 11, the bolt 200 is disconnected from the nut 102 and coaxially aligned with the axis A and the bore 122. Turning to FIG. 12, as the bolt 200 enters the bore 122, the bolt 200 may engage the wall 126 of the bore 122 to align itself for proper fitting, thereby avoiding a cross-threading error. Threads 202 of the bolt 200 engage the internal threading 124 of the nut 102 in FIG. 13. Accordingly, rotation of the nut 102 provides axial forces on the engaged threads that force the bolt 200 to burst through the aperture 120 in the head 118 of the nut 102, as shown in FIG. 14.

The nut 102 is designed so that when (or as) the bolt 200 reaches the aperture 120, it can be deformed by threads 202 on the bolt 200 when a particular amount of torque is applied to the nut 102 and/or the bolt 200. This particular amount of torque is called a burst-through torque and is the minimum torque required to deform the nut 102. According to aspects of the present disclosure, because the aperture diameter d may be smaller than the bore diameter d' (see, e.g., FIG. 10), the bolt 200 may deform portions of the nut 102 around the aperture 120 to pass therethough. Correspondingly, the aperture 120 may be sized to determine the torque required to burst-through the dome-shaped head 118. In some instances, for example, the nut 102 may require a burst-through torque of greater than 1 newton meter (Nm). In additional non-limiting examples, the nut 102 may require a burst-through torque of greater than 6 Nm. The dome-shaped head can be tuned to meet a customer's requirements.

A relationship exists between the aperture diameter d (see, e.g., FIG. 10) and the burst-through torque required for the respective nut. Therefore, the nut according to aspects of the present disclosure may be shaped to achieve particular burst-through torque values, for example, to meet a customer's requirements. Referring to FIG. 10, by forming the nut so that it comprises a particular aperture diameter d and cavity height H" (e.g., by pressing the nut into a mold that defines a hemispherical recess at different loads), a particular burst-through torque of the nut 102 may be achieved. More specifically, the aperture diameter d may be inversely related to the burst-through torque. With reference to FIGS. 11-14, this correlation exists because, as the aperture diameter d decreases, interference between the threads 202 on the bolt 200 and the nut 102 around the aperture 120 is increased, which can result in increased frictional resistance. Increased frictional resistance may require a greater amount of torque to deform the nut 102 (i.e., burst-through the aperture 120). Therefore, the nut 102 according to aspects of the present disclosure is compatible and effective with anti-cross threading bolts while still providing frictional interference to enhance security.

As described above, the present disclosure provides a nut that may be deformed by a bolt, which results in frictional resistance between internal threads of the nut and external threads of the mating bolt to prevent loosening. Accordingly, assembly machines or operators may monitor the torque during rundown, and, upon detecting the burst-through torque value, the machine or operator knows the status of the rundown. After reaching the burst through point, the machine or operator may monitor the degrees of rotation required for rundown to be complete.

Figure 16:
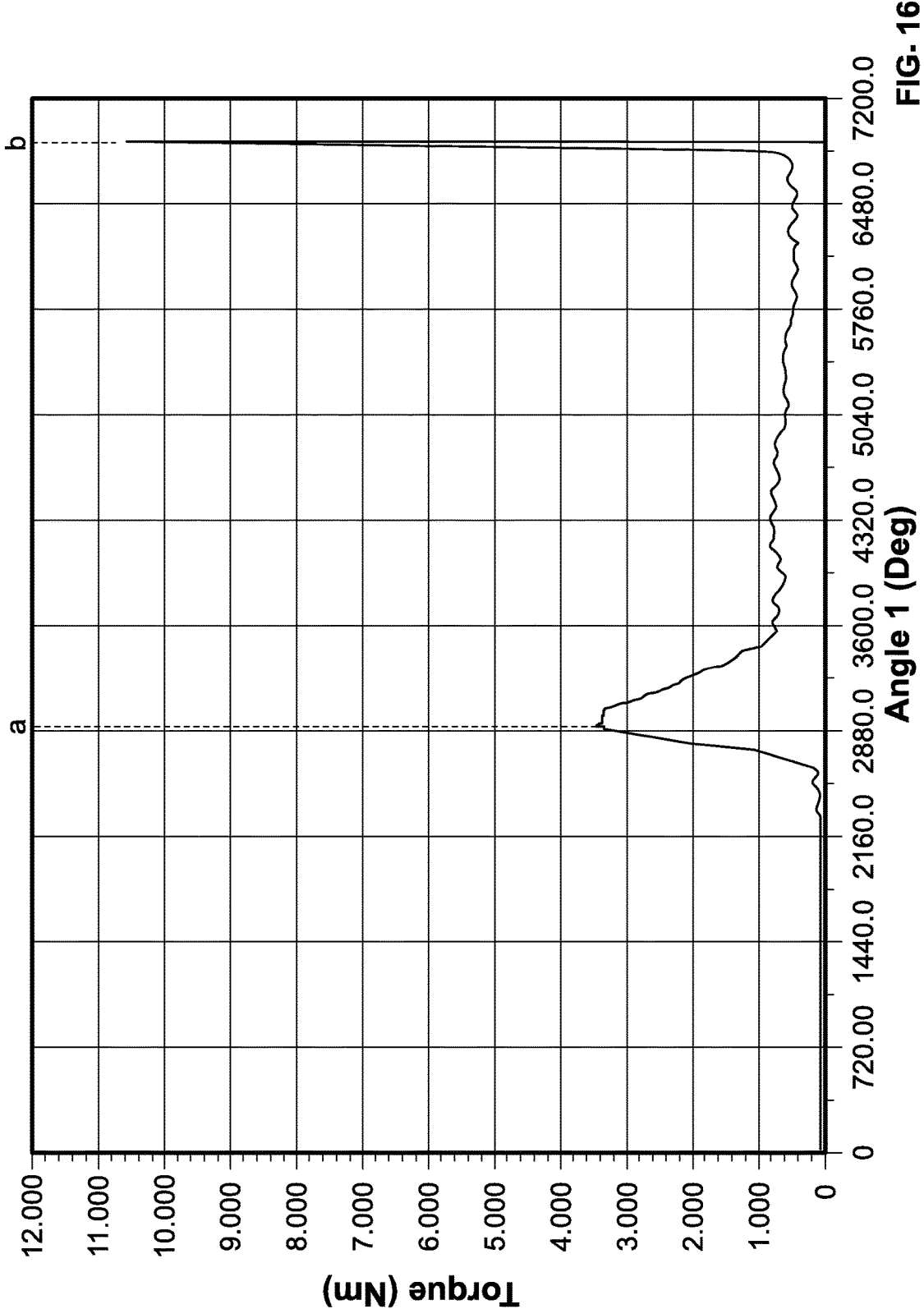
FIG. 16 is a graph depicting testing results of a nut having a curved or domed head that is fully threaded onto a bolt, where torque in newton-meters is represented on the vertical axis and an angle of rotation in degrees is represented on the horizontal axis.

For example, FIG. 16 illustrates a graph of the torque (newton-meters) and angle of rotation (degrees) measured during rundown of the nut according to aspects of the present disclosure. Indicated at point a, a noticeable increase in torque is recorded at 2,880 degrees of rotation. This drastic increase in torque corresponds to the burst-through torque. Accordingly, a good rundown will first have a minimal amount of torque measured prior to the burst-through stage, which may suddenly increase at point a to the burst-through torque. At this point, once the bolt deforms portions of the nut surrounding the aperture, the machine or operator may begin counting degrees of rotation until a full rundown is achieved. Therefore, the torque measured at burst-through being consistent with the predetermined burst-through torque value may be indicative of a proper fit and alignment. Additionally, the torque measured after burst-through being consistent may also be indicative of proper fit and alignment. Reaching an expected number of degrees of rotation after burst-through (e.g., 4000 degrees) may be indicative of rundown completion. The operator thus may perform rundowns with greater certainty that a proper final torque has been applied, uninhibited by cross-threading.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the present disclosure and claims. The entire disclosure of each patent and publication cited herein is incorporated by reference, as if each such patent or publication were individually incorporated by reference herein.

We claim:

1. A nut configured to couple to a bolt, the nut comprising:
   a main body defining an axially aligned bore and including a first end, a second end, and threads disposed on an interior wall thereof; and
   a continuous dome-shaped head disposed at the second end thereof having an axially aligned aperture with an aperture diameter that is smaller than a bore diameter of the axially aligned bore,
   wherein a beveled portion is disposed between a neck and the second end of the main body,
   wherein the neck is formed integrally between the beveled portion and the continuous dome-shaped head, the neck having an outer diameter D' that is uniformly cylindrical and extending parallel to an axis A of the nut for a height H,
   wherein the continuous dome-shaped head is provided to be deformed by threads disposed on the bolt when a predetermined burst-through torque is applied thereto,
   wherein the aperture diameter of the axially aligned aperture is inversely related to the predetermined burst-through torque,
   wherein the axially aligned aperture is deformed by the threads of the bolt at a burst-through point, and
   wherein the deformed nut is rotated beyond the burst through point by an expected number of revolutions around the bolt to provide a proper fitting.

2. The nut of claim 1, wherein the main body includes a plurality of equidistantly spaced walls.

3. The nut of claim 2, wherein the main body includes six equidistantly spaced walls.

4. The nut of claim 1, wherein the continuous dome-shaped head further includes a cavity adjoining the axially aligned bore and the axially aligned aperture.

5. The nut of claim 4, wherein the cavity has a greatest diameter that is greater than the diameter of the axially aligned bore.

6. The nut of claim 5, wherein the cavity has a volume that is equal to or less than a volume defined by a threaded portion of the bore.

7. The nut of claim 1 further including a flange disposed at the first end and extending radially outward therefrom.

8. The nut of claim 7, wherein the main body and the flange are integrally formed.

9. The nut of claim 1, wherein the bore comprises a circular cross-section.

10. A nut configured to couple to a bolt, the nut comprising:
    a flange, the flange having an outer diameter D;
    a main body defining an axially aligned bore having threads disposed on an interior wall thereof; and
    a continuous dome-shaped head disposed at an outermost end thereof and having an axially aligned aperture with an aperture diameter,
    wherein the continuous dome-shaped head is provided to be deformed at a burst-through point by threads disposed on the bolt when a predetermined torque is applied thereto,
    wherein a neck is formed integrally between the main body and the continuous dome-shaped head, the neck being uniformly cylindrical and extending parallel to an axis A of the nut for a height H, the neck having an outer diameter D' that is smaller than the outer diameter D of the flange;
    wherein a beveled portion is disposed between the neck and the second end of the main body,
    wherein the axially aligned aperture is deformed by the threads of the bolt at a burst-through point, and
    wherein the deformed nut is rotated beyond the burst through point by an expected number of revolutions around the bolt to provide a proper fitting.

11. The nut of claim 10, wherein the predetermined torque is inversely related to the aperture diameter.

12. The nut of claim 10, wherein the predetermined torque is greater than 1 Nm.

13. The nut of claim 12, wherein the predetermined torque is greater than 6 Nm.

14. The nut of claim 10 being further compatible with anti-cross threading bolts.

15. The nut of claim 10, wherein the main body further includes a first end and a second end, and wherein a flange is disposed at the first end thereof and extends radially outward therefrom.

16. The nut of claim 10, wherein the aperture diameter is smaller than a bore diameter of the axially aligned bore.

* * * * *